Oct. 31, 1961   C. VAN DER LELY ET AL   3,006,133
SIDE DELIVERY RAKING DEVICE
Filed June 17, 1957   6 Sheets-Sheet 1

United States Patent Office 3,006,133
Patented Oct. 31, 1961

3,006,133
SIDE DELIVERY RAKING DEVICE
Cornelis van der Lely and Ary van der Lely, Maasland, Netherlands, assignors to C. van der Lely N.V., Maasland, Netherlands, a Dutch limited company
Filed June 17, 1957, Ser. No. 665,961
Claims priority, application Netherlands June 18, 1956
20 Claims. (Cl. 56—377)

This invention relates to improvements in farm implements of the kind having rake wheels which are rotated by contact either with the ground or the crop lying thereon and wherein the implements are convertible for use in performing different operations, for example, for use as side delivery rakes, tedders, swath turners and swath spreaders.

The existing devices of the described character which are convertible for two or more of the above mentioned uses have complicated constructions, and are not easily converted or changed from one working condition to another.

Accordingly, it is an object of the present invention to provide a farm implement of very simple construction having rake wheels which are rotated by contact with the ground or the crop lying thereon to displace the crop in a sidewards direction, and wherein the implement is easily convertible for use as a side delivery rake and as a swath turner, tedder or swath spreader.

In accordance with an aspect of this invention, a farm implement includes a frame beam extending transversely with respect to the direction of travel of the implement, and supporting members secured to the frame beam at locations spaced apart along the latter and extending parallel to the direction of travel to each carry a rake wheel which is rotatable in a vertical plane disposed at an angle to the direction of travel, so that the resulting structure is light in weight and the implement may be simply and rapidly convered from a working position, wherein it operates as a side delivery rake, to other working positions wherein the implement is useful as a swath turner, swath spreader or tedder, respectively.

In a particular embodiment of this invention, each supporting member carrying a rake wheel is individually fastened to the frame beam, while at least two of the supporting members are detachable from the frame beam and interchangeable with respect to each other, thereby to permit the converting of the implement from the working position where it is useful as a side delivery rake to other working positions, for example, where the implement is useful as a swath turner or as a tedder, without the necessity of additional components in the structure which would add to the weight and complexity thereof.

In the above mentioned particular embodiment of the invention, it is preferable that each rake wheel be mounted on a bearing which can be turned about a substantially horizontal axis extending parallel to the direction of travel with respect to the related supporting member so that the inclination of the plane of rotation of the rake wheel relative to the direction of travel may be reversed, whereby the implement can be easily converted from a side delivery rake operating to deliver the crop to one side of the implement to a side delivery rake operating to deliver the crop to the other side of the implement merely by turning the bearings of the rake wheels through 180 degrees relative to the supporting members.

Another object of the invention is to provide a farm implement of the described character which may be easily reduced in size for convenience in storage or transport from one job to another and, in accordance with an aspect of the invention, this object is achieved by forming the transversely extending frame beam of at least two pivotally connected portions which are aligned during operation of the implement, and wherein at least one of the frame portions may be raised or pivoted relative to the other frame portions in order to substantially reduce the width of the implement.

Still another object of the invention is to provide an improved arrangement for removably attaching each supporting member to the frame beam so that the supporting member and its related rake wheel may be quickly and easily detached from the frame beam, at one location along the latter, and then quickly and easily reattached to the frame beam, at another location along the latter, without the necessity for loosening nuts or removing locking pins or the like.

A further object of the invention is to provide a resilient mounting for each supporting member on the frame beam, so that the supporting members may be resiliently displaced with respect to the frame beam.

Further, in connection with the above object of the invention, it is advantageous that the resilient mounting structure for each supporting member be removable with the latter from the frame beam so that, when a supporting member is relocated along the frame beam, the adjustment of the resilient mounting, which is dependent upon the distance between the mounting for the supporting member and the related rake wheel, need not be varied.

A still further object of the invention is to provide a farm implement of the described character with means for simultaneously lifting all of the rake wheels out of contact with the ground by a single manual operation.

The above, and other objects, features and advantages of the invention, will be apparent in the following detailed description of illustrative embodiments thereof which is to be read in connection with the accompanying drawings forming a part hereof, and wherein.

Figures 1, 2, 3:
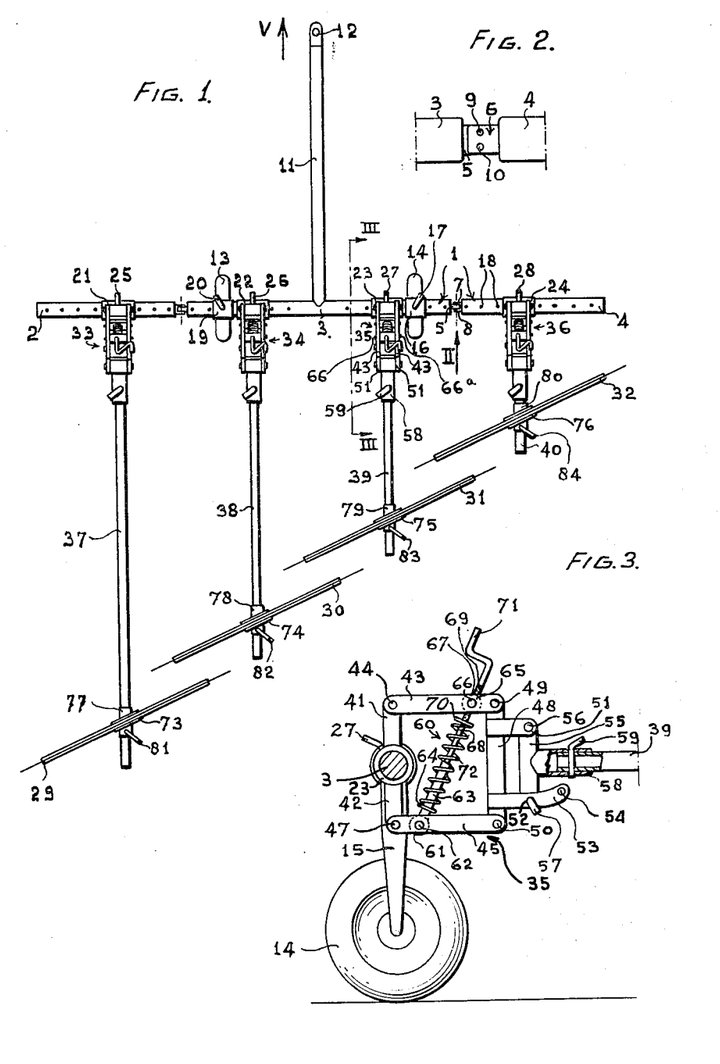
FIG. 1 is a top plan view of a farm implement embodying the present invention, and wherein the farm implement is shown in a working position for use as a side delivery rake operating to deliver the crop toward the left.
FIG. 2 is an enlarged, detail elevational view of a part of the farm implement, as viewed in the direction of the arrow II on FIG. 1.
FIG. 3 is an enlarged, detail sectional view taken along the line III—III on FIG. 1.

Referring to the drawings in detail, and initially to FIG. 1 thereof, it will be seen that a farm implement embodying the present invention includes a frame beam, generally identified by the reference numeral 1, which extends transversely with respect to the normal direction of travel of the implement, as indicated by the arrow V. The frame beam 1 preferably includes a central portion 3 and end portions 2 and 4 which are pivotally connected to the opposite ends of central portion 3 so as to be swingable between operative positions wherein the end portions 2 and 4 are aligned with the central portion 3, as shown in FIG. 1, and transport or storage positions (not shown), wherein the end portions 2 and 4 are pivoted upwardly relative to the central portion of the frame beam, thereby to reduce the lateral width of the implement. A suitable connection between the central portion 3 and each of the end portions 2 and 4 is illustrated in FIGS. 1 and 2, and although the particular structure embodied in such connection will be described with particular reference to the connection between the portions 3 and 4, it will be understood that the connection between the portions 2 and 3 has the same structure. Referring to FIGS. 1 and 2, it will be seen that the end of central portion 3 has a lug 5 extending therefrom, while the inner end of portion 4 has a fork 6 extending therefrom with the lug 5 being received between the tabs or legs 7 and 8 of fork 6. The lug 5 has two vertically spaced apart holes therein, while the legs 7 and 8 of fork 6 also have spaced apart holes therein which register with the holes in the lug 5 when the end portion 4 is aligned with the central portion 3 to receive pins 9 and 10 (FIG. 2) which serve to rigidly connect the portions 3 and 4 to each other. However, it will be apparent that, when the pin 10 is removed, the end portion 4 may be pivoted upwardly about the pin 10 relative to the central portion 3.

A draw bar 11 extends forwardly from the central portion 3 of frame beam 1 and is provided with an eye 12 at its forward end by means of which it can be coupled to a tractor or the like for drawing the farm implement.

The frame beam 1 is supported by running wheels 13 and 14 which are carried by forks depending from sleeves 16 and 19, respectively, slidable along the frame beam 1, or more particularly, the central portion 3 of the frame beam. For example, as shown in FIG. 3, the running wheel 14 is rotatable about a fixed horizontal axis with respect to its supporting fork 15 which depends from, and is rigidly connected to, the sleeve 16. A series of holes 18 is formed in the beam 1 at locations spaced apart longitudinally along the latter, and the sleeves 16 and 19 are provided with locking pins 17 and 20, respectively, which are receivable in selected openings 18 in order to lock the sleeves 16 and 19 at corresponding selected locations along the frame beam. Thus, by withdrawing the locking pins 17 and 20 from holes 18 in which such pins are engaged, the sleeves 16 and 19 may be moved along the frame beam to vary the lateral positions of the running wheels 14 and 15.

The farm implement of FIG. 1 further includes sleeves 21, 22, 23 and 24 which are also slidable on the frame beam 1 and which are provided with locking pins 25, 26, 27 and 28, respectively, adapted to be received in selected holes 18 for locking the related sleeves or bearings at selected locations along the frame beam, and it is obvious that the locations of the sleeves or bearings 21, 22, 23 and 24 may be adjusted or varied merely by withdrawing the related locking pins from the holes 18 and by sliding the sleeves along the frame beam to new locations where the related locking pins are re-introduced into registering holes 18.

The sleeves or bearings 21, 22, 23 and 24 carry parallelogram mounting structures which are generally identified by the reference numerals 33, 34, 35 and 36, respectively. The mounting structures 33, 34, 35 and 36 are all of the same construction and, as shown in FIG. 3, the mounting structure 35 includes tab-like projections 41 and 42 extending upwardly and downwardly, respectively, from the related bearing or sleeve 23. Two parallel, spaced apart strips 43 receive the projection 41 between their forward ends and are pivotally connected to the projection 41 by means of a pivot pin 44. Two parallel, spaced apart strips 45 similarly receive the projection 42 between their forward ends and are pivotally connected to the projection 42 by means of a pivot pin 47. A tube 48 extends generally parallel to the projections 41 and 42 and has its upper and lower ends received between the rear end portions of the strips 43 and 45, respectively, and the ends of the tube 48 are pivotally connected to the strips 43 and 45 by pivot pins 49 and 50, respectively. Two tags 51 extend rearwardly from the upper portion of tube 48 at the opposite sides of the latter, and two strip-like extensions 53 extend rearwardly from the lower portion of the tube 48 at the opposite sides of the latter, with the rear end portions of the extensions 53 being curved upwardly, as shown in FIG. 3. A tube 55 has its upper end received between the tags 51 and is pivotally connected to the latter by means of an axle 56, while the lower end of the tube 55 is received between the extensions 53 and has a lateral opening therein (not shown) which is adapted to be selectively registered with one or the other of two openings 52 and 54 formed in the extensions 53 and spaced equally from the axle 56 so that, when the opening in tube 55 is aligned with the opening 52 of extensions 53, a locking pin 57 can be received within the aligned openings to secure the tube 55 relative to the tube 48 in the position shown in FIG. 3 and, when the pin 57 is removed, the tube 55 may be pivoted about the axle 56 until its opening is aligned with the opening 54 to again receive the pin 57 for locking the tube 55 in an inclined position relative to the tube 48.

A tube 58 extends rearwardly from the center of the tube 55 and is open at its back end, and a locking pin 59 is receivable in suitable openings in the tube 58 for the purpose of removably securing a support member therein, as will be hereinafter described in detail. A spring structure generally identified by the reference numeral 60 is provided between the strips 43 and 45 and includes a bearing 61 mounted on a pin 62 between the strips 45 and having a tube 63 extending therefrom with an annular flange or abutment 64 on the latter. A bearing 65 is disposed between the strips 43 and is pivotally connected to the latter by pins 66 and 66a (FIG. 1) extending from the opposite sides of the bearing 65 and received in suitable openings in the strips 43. The bearing 65 has a tapped opening 67 therein receiving the screw-threaded portion 69 of a rod 68 which, at its lower end, extends slidably into the tube 63. A disc 70 is fixed on the rod 68 below the strips 43, and the upper end of the rod 68 is provided with a crank handle 71. A helical compression spring extends around the tube 63 and rod 68 and, at its opposite ends, abuts against the annular flange 64 and the disc 70, respectively. As seen in FIG. 3, the pivot pin 62 is disposed adjacent the forward ends of the strips 45, while the pivot pins 66 and 66a are disposed adjacent the rear ends of the strips 43, so that the rod 68 and the tube 63 extend generally diagonally across the parallelogram formed by the extensions 41 and 42, the strips 43 and 45 and the tube 48 and the spring 72 resists deformation of the parallelogram in the direction tending to lower the tube 48 relative to the frame beam 1 when a downward load is applied to the tube 58.

As seen in FIG. 1, the farm implement embodying the present invention further includes rake wheels equal in number to the mounting structures 33, 34, 35 and 36 and identified by the reference numerals 29, 30, 31 and 32, respectively. The rake wheels 29, 30, 31 and 32 are rotatably carried by supporting members 37, 38, 39 and 40, respectively, which can be either curved or straight and extend parallel to the direction of travel of the implement, as indicated by the arrow V, and which, at their forward ends, are adapted to be received in the tubes 58 of the mounting structures. As seen in FIG. 3, the forward end portion of each of the supporting members 37, 38, 39 and 40 is provided with diametrically aligned openings adapted to register with the openings in the tube 58 in which the supporting member is inserted, thereby to receive the locking pin 59 which removably secures the supporting member against withdrawal from, and rotation within the related tube 58.

The rake wheels 29, 30, 31 and 32 are rotatable about bearings 73, 74, 75 and 76, respectively, which are carried by sleeves 77, 78, 79 and 80, respectively, with the axis of rotation of each rake wheel on its bearing forming an acute angle with respect to the axis of the related sleeve 77, 78, 79 or 80. The sleeves 77, 78, 79 and 80 are turnably mounted on the supporting members 37, 38, 39 and 40, respectively, and are secured to the latter by locking pins 81, 82, 83 and 84, respectively, which extend through diametrical holes in the related sleeves and supporting members, and such diametrical holes are located so that they will register to receive the related locking pin only when the axis of rotation of the related rake wheel lies in a horizontal plane including the axis of the related supporting member 37, 38, 39 or 40 and encloses an acute angle with the latter at one side or the other of the supporting member.

As seen in FIG. 1, the rake wheels 29, 30, 31 and 32 are disposed at different distances from the forward ends of their related supporting members 37, 38, 39 and 40. In the illustrated embodiment of the invention, the different distances between the rake wheels and the forward ends of the related supporting members are achieved by providing supporting members of progressively different lengths, as shown in FIG. 1.

The farm implement embodying the present invention and described with reference to FIGS. 1, 2 and 3 of the drawings operates as follows:

During forward movement of the implement in the direction indicated by the arrow V, the rake wheels 29, 30, 31 and 32 are rotated about their bearings 73, 74, 75 and 76 by contact with the ground or with the crop lying thereon. When the rake wheels are arranged as shown in FIG. 1, that is, with the supporting members 37, 38, 39 and 40 being attached, at their forward ends, to the mounting structures 33, 34, 35 and 36, respectively, so that the distances from the rake wheels to the transversely extending beam 1 increase progressively toward the left, and with the sleeves 77, 78, 79 and 80 secured to the related supporting members so that the planes of rotation of the related rake wheels and a vertical plane passing through the frame beam 1 enclose an angle opening toward the left, the described implement will operate as a side delivery rake delivering the crop toward the left, as viewed in FIG. 1.

The pressure of the rake wheels on the ground can be controlled by rotating the crank 71 in each of the mounting structures 33, 34, 35 and 36, thereby to vary the distance between the related abutment 64 and disc 70 and correspondingly to vary the force exerted by the related spring 72 to resist downward movement of the tube 48 and of the supporting member 37, 38, 39 or 40 received in the related tube 58. Since the spring 72 resiliently resists downward movement of the related rake wheel, it is apparent that the latter can freely adapt to the unevenness of the ground being traversed. Further, by reason of the parallelogram arrangement provided in each of the mounting structures 33, 34, 35 and 36, the related rake wheel, in following the unevenness of the ground being traversed, will continue to rotate in a vertical plane.

Figure 4:
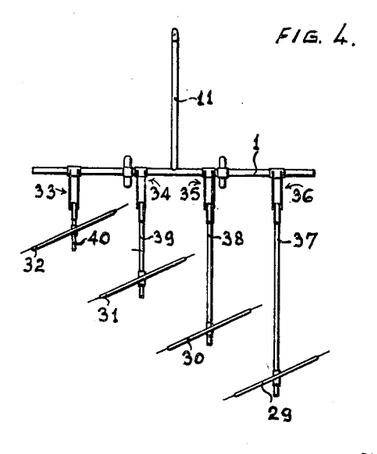
FIG. 4 is a diagrammatic, top plan view of the farm implement of FIG. 1, with the latter shown in the working position for use as a tedder operating to deliver the crop to the left.

When it is desired to use the described farm implement as a tedder, the pins 59 securing the supporting members 37, 38, 39 and 40 to the mounting structures are removed thereby to permit withdrawal of the supporting members from the tubes 58 of the mounting structures. Then, the implement is reassembled with the supporting members 37, 38, 39 and 40 being secured, at their forward ends, in the tubes 58 of the mounting structures 36, 35, 34 and 33, respectively, as shown in FIG. 4.

Figure 5:
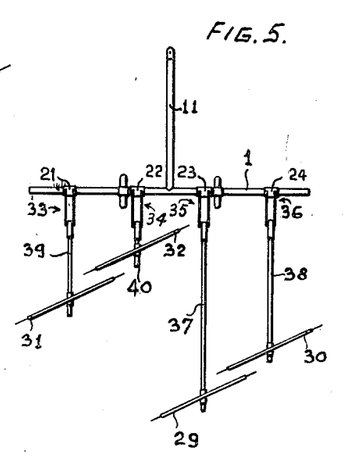
FIG. 5 is a view similar to that of FIG. 4, but showing the farm implement converted to a working position wherein it may be used as a swath turner operating to deliver the crop toward the left.
Figure 6:
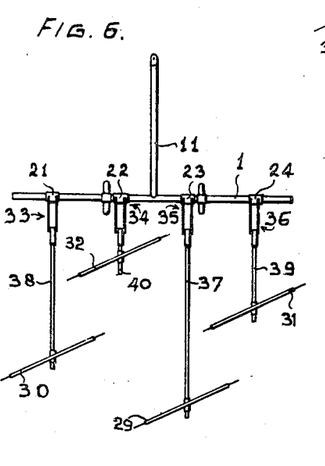
FIG. 6 is a view similar that of FIG. 5, but wherein the farm implement is further converted to a working position for use as a modified form of swath turner.

If it is desired to use the described farm implement as a swath turner, it is then only necessary to rearrange the supporting members 37, 38, 39 and 40 so that they are attached to the mounting structures 35, 36, 33 and 34, respectively, as shown in FIG. 5, or the mounting structures 35, 33, 36 and 34, as shown in FIG. 6.

It is apparent that the conversion of the farm implement for use as a side delivery rake (FIG. 1), as a tedder (FIG. 4) or as a swath turner (FIGS. 5 and 6) may be easily effected, since such conversion is effected by merely rearranging the supporting members following the simple removal of the locking pins 59.

With the farm implement converted for use as a swath turner, as in FIG. 5 or in FIG. 6, the implement can be further made to turn a swath and spread it to a broader extent merely by lifting the rake wheels 29 and 31, in the arrangement of FIG. 5, or the rake wheels 31 and 32, in the arrangement of FIG. 6, so that the lifted rake wheels will be free of the ground. Such lifting of the rake wheels 29 and 31 (FIG. 5) or of the rake wheels 29 and 30 (FIG. 6) out of contact with the ground may be effected by rotating the cranks 71 of the related mounting structures 33 and 35 in the direction for increasing the forces applied by the related springs 72 so that the supporting members 37 and 39 (FIG. 5) or the supporting members 37 and 38 (FIG. 6) are moved upwardly while remaining substantially horizontal. Following the upward movement of the rake wheels 29 and 31 (FIG. 5) or of the rake wheels 29 and 30 (FIG. 6), the rake wheels of each group, for example, the group formed by the rake wheels 29 and 30 and the group formed by the rake wheels 31 and 32 (FIG. 5) are moved laterally closer to each other. Such lateral movement of the rake wheels closer to each other may be effected by displacing the sleeves 21 and 24 of the mounting structures 33 and 36, respectively, along the frame beam 1 in the directions toward the sleeves 22 and 23, respectively. However, in order to permit the relatively close approach of the sleeves 21 and 22 and of the sleeves 23 and 24, it is necessary that the supporting members be bowed upwardly to an extent sufficient to permit passage of the rake wheels thereunder. For example, in the arrangement of FIG. 5, the supporting member 39 must be bowed upwardly to permit the passage of the rake wheel 32 thereunder, while the supporting member 37 must be similarly bowed upwardly to permit the passage thereunder the rake wheel 30.

When the farm implement is in the working position illustrated in FIG. 5 and the rake wheels 29 and 31 are moved upwardly out of contact with the ground, or when the implement is in the working position of FIG. 6 and the rake wheels 29 and 30 are elevated out of contact with the ground, the front rake wheel of each group, that is, the rake wheels 30 and 32 in FIG. 5, or the rake wheels 31 and 32 in FIG. 6, is rotated by contact with the ground whereas the second rake wheel in each group, that is, the rake wheels 29 and 31 in FIG. 5 and the rake wheels 29 and 30 in FIG. 6, is rotated by its contact with the crop. Then, the front rake wheel of each group turns the swath, while only the upper part of the swath is engaged by the second rake wheel of the related group so as to be delivered laterally, whereby the swath is turned intensely for increased drying and the breadth of the swath is increased. Thus, the crop is spread substantially uniformly over the field.

It will be apparent that, in the arrangement illustrated in FIG. 6, the distance between the rake wheels of each group considered in the direction of travel, that is, the distance between the rake wheels 30 and 32 and between the rake wheels 29 and 31, is much larger than the corresponding distance between the rake wheels of each group in the arrangement illustrated by FIG. 5. Such a relatively large distance between the rake wheels of each group may, in certain cases, be advantageous in view of the nature of the crop to be worked. The arrangement shown in FIG. 6 provides the most desirable treatment for the crop, as the line of connection between the centers of the rake wheels in each group, that is, between the centers of the rake wheels 30 and 32 and between the centers of the rake wheels 29 and 31 is at a relatively smaller angle with respect to the direction of travel of the implement.

Figure 7:
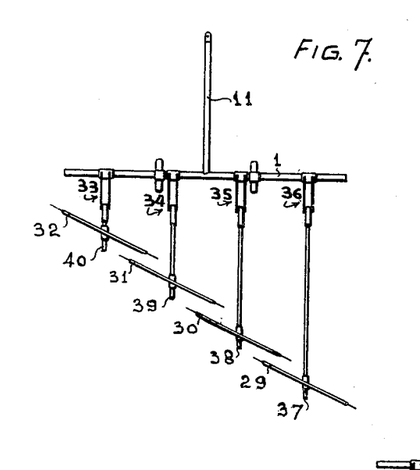
FIG. 7 is a diagrammatic, top plan view of the farm implement of FIG. 1, but with the latter shown in the working position for use as a side delivery rake operating to deliver the crop toward the right.

The farm implement described above and shown in FIG. 1 in a working position for use as a side delivery rake delivering the crop toward the left, may be converted into a side delivery rake delivering the crop toward the right, as shown in FIG. 7. In such converted arrangement, the supporting members 37, 38, 39 and 40 are merely attached to the supporting structures 36, 35, 34 and 33, respectively, and the locking pins 81, 82, 83 and 84 (FIG. 1) are released to permit the turning of the related sleeves 77, 78, 79 and 80 about the axes of the supporting members through 180 degrees whereupon the locking pins are reinstalled with the planes of rotation of the rake wheels and the vertical plane passing through the frame beam 1 then enclosing angles which open toward the right, as shown in FIG. 7. If the several rake wheels have tines which are intended to always point backwards with respect to the direction of rotation of the rake wheels, the reversal of the inclination of the planes of rotation of the rake wheels will have to be effected by bodily removing the related sleeves 77, 78, 79 and 80 from the supporting members and then turning each rake through 180 degrees about a diametrical axis thereof prior to reinstalling the sleeves 77, 78, 79 and 80 upon the supporting members 37, 38, 39 and 40, respectively. Such reversing of the rake wheels by turning about diametrical axes, as described above, will insure that the tines thereof will still point backwards with respect to the direction of rotation when the rake wheels are installed in the working position of FIG. 7.

Figure 8:
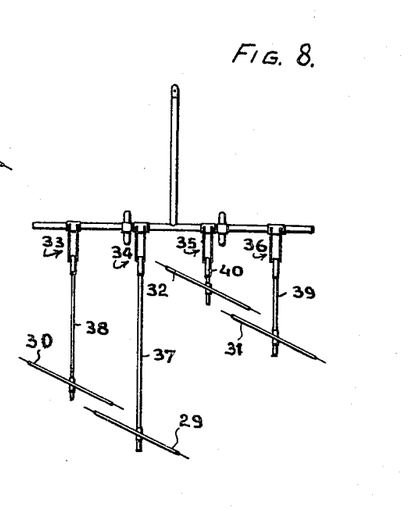
FIG. 8 is a diagrammatic view similar to that of FIG. 5, but with the farm implement being shown in the working position for use as a swath turner delivering the crop toward the right.

With the farm implement in the working position of FIG. 7, the farm implement can be easily further converted to operate as a swath turner delivering the crop to the right, merely by attaching the supporting members 37, 38, 39 and 40 to the mounting structures 34, 33, 36 and 35, respectively, as shown in FIG. 8.

It is obvious that with the farm implement in the working position of FIG. 8 for use as a swath turner, the rake wheels 29 and 31 may be elevated out of contact with the ground in order to cause the swath to be turned and spread more broadly, as described in connection with the working positions of the farm implement illustrated in FIGS. 5 and 6.

Figure 9:
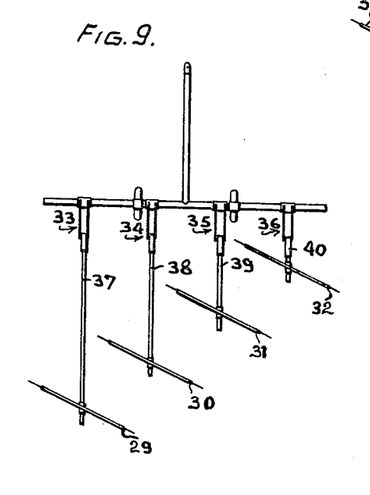
FIG. 9 is a diagrammatic view similar to that of FIG. 4, but with the farm implement being shown in the working position for use as a tedder delivering the crop toward the right.

With the several rake wheels related to their respective supporting members in the manner described above in connection with FIG. 7, the described farm implement can be further converted for use as a tedder delivering the crop to the right merely by attaching the supporting members 37, 38, 39 and 40 to the mounting structures 33, 34, 35 and 36, respectively, as shown in FIG. 9.

In order to move the farm implement described above in connection with FIGS. 1, 2 and 3 into a transport position, wherein the several rake wheels will be lifted well above the ground traversed, each pin 57 (FIG. 3) is removed from the opening 52 of the strips 53, and the related supporting member is then swung upwardly about the axle 56 of the related mounting structure until the openings in the lower end of the tube 55 register with the openings 54 in the strips 53 to again receive the pin 57 which then holds the related supporting member 37, 38, 39 or 40 in an upwardly inclined position. Thereafter, as previously described the pin 10 can be removed from the hinged connection between each of the opposite ends of the central frame beam portion 3 and the end portions 2 and 4 so that the latter may then be pivoted upwardly and toward the longitudinal center of the implement.

Figure 10:
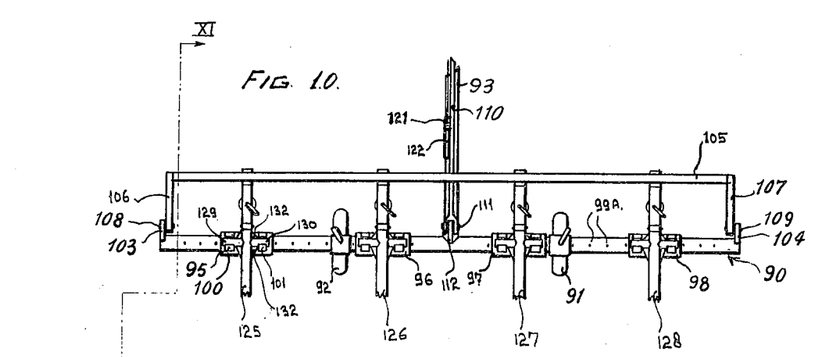
FIG. 10 is a fragmentary top plan view of a farm implement constructed in accordance with another embodiment of the present invention.
Figure 11:
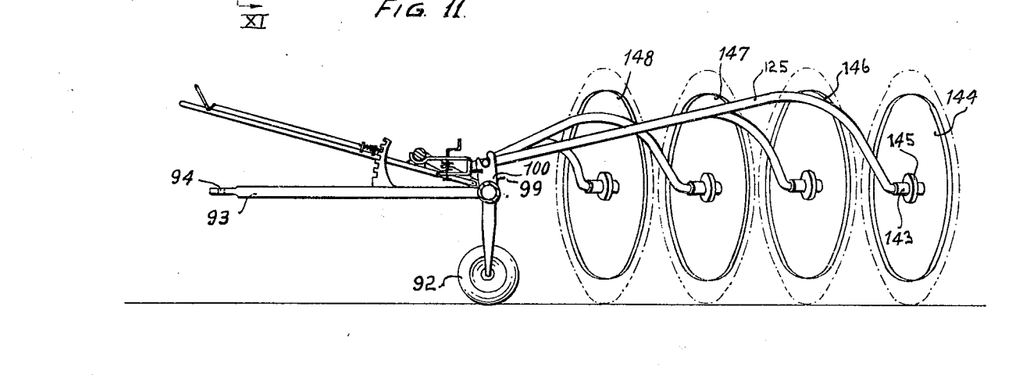
FIG. 11 is a side elevational view of the complete farm implement constructed in accordance with the embodiment of FIG. 10, and in section as viewed along the line XI—XI of FIG. 10.
Figure 11A:
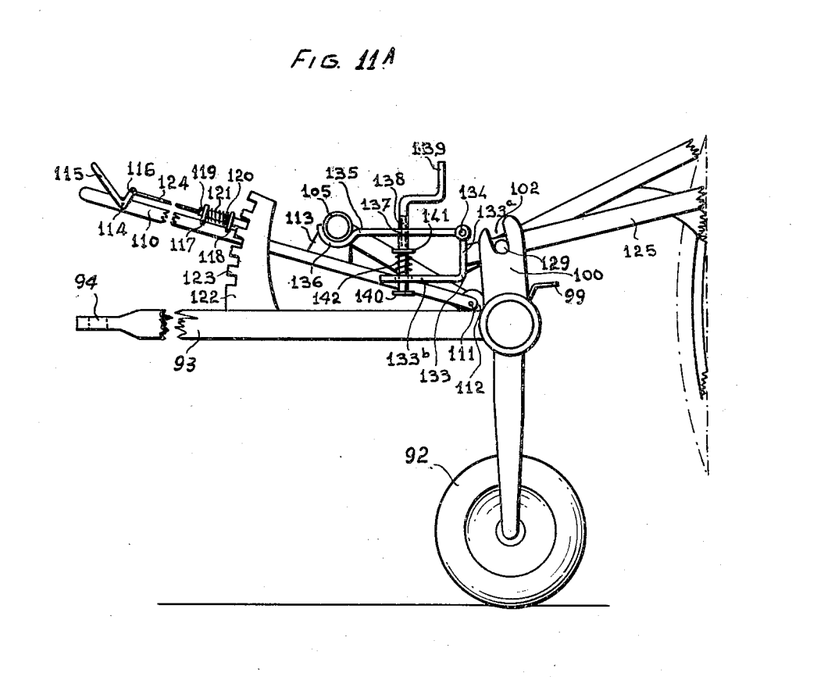
FIG. 11A is an enlarged view of a portion of the structure shown in FIG. 11.

Referring now to FIGS. 10, 11 and 11A, it will be seen that the farm implement constructed in accordance with the embodiment of the invention there illustrated includes a frame beam 90 supported by running wheels 91 and 92 which are mounted on the frame beam 90 in the same manner as has been described with respect to the mounting of the running wheels 13 and 14 on the frame beam 1 in connection with the description of the embodiment in FIG. 1.

The frame beam 90 has a traction arm 93 extending forwardly therefrom and provided with an eye 94 at its forward end for connection to a tractor or the like by which the farm implement may be drawn.

The frame beam 90 is provided with a series of longitudinally spaced apart holes 99A, and bearing sleeves 95, 96, 97 and 98 are slidable along the frame beam 90 and are each provided with a locking pin 99 (FIG. 11) receivable in a selected one of the holes 99A for securing the related bearing sleeve at a selected location along the frame beam.

Each of the bearing sleeves 95, 96, 97 and 98 is provided with two upright extensions 100 and 101 which are formed with upwardly opening notches 102 (FIG. 11 and 11A) in the upper ends thereof. Lugs 103 and 104 are secured to the opposite ends of the frame beam 90 (FIG. 10) and carry pins 108 and 109 on which arms 106 and 107 are pivotally mounted. Extending between the forward ends of the arms 106 and 107 is a thrust beam or rod 105 which is disposed parallel to the axis of the frame beam 90. A lug 112 is rigidly secured to the frame beam 90, at the center of the latter, and carries a pin 111, and an arm 110 is pivotally mounted, at its back end, on the pin 111 and is rigidly secured to the thrust arm or rod 105 by means of a connection 113. A handle 115 is rockable on a pin 114 carried by the free or forward end of the pivoted arm 110, and a lever arm 116 is integral with, or suitably joined to, the handle 115 for rocking movement with the latter.

The abutments 117 and 118 are secured to the arm 110 at locations spaced apart along the latter, and such abutments are provided with apertures receiving and guiding a slidable pin 119 so that the latter is movable parallel to the longitudinal axis of the arm 110. A disc 120 is secured to the pin 119 between the abutments 117 and 118, and a helical compression spring 121 extends around the pin 119 and abuts, at its opposite ends, against the abutment 117 and the disc 120 thereby to urge the pin 119 to a position wherein an end of the latter projects beyond the abutment 118.

A sector or quadrant 122 having teeth 123 thereon is secured to the traction arm 93 with the teeth 123 lying along the path of travel of the projecting end of the pin 119 during rocking of the arm 110 so that rocking of the arm 110 about its pivot pin 111 is normally prevented by the engagement of the pin 119 between adjacent teeth of the sector 122. A tension rod 124 is connected, at its opposite ends, to the lever arm 116 and to the pin 119, respectively, so that rocking of the handle 115 toward the arm 110 will be effective to remove the pin 119 from engagement with the teeth 123 and will thereby free the arm 110 for rocking movement thereof about the pivot pin 111.

The farm implement of FIGS. 10, 11 and 11A further includes supporting members 125, 126, 127 and 128 which are removably mounted upon the frame beam 90, in a manner hereinafter described in detail, and which carry rake wheels 144, 146, 147 and 148, respectively.

As shown in FIG. 10, each of the supporting members 125, 126, 127 and 128 is provided with diametrically opposed pins 129 and 130 extending from the related supporting member at locations adjacent the forward end of the latter and adapted to be received in the upwardly opening notches 102 in the upper ends of the upright lugs 100 and 101 of a selected one of the bearing sleeves 95, 96, 97 and 98. Stiffening webs or gussets 132 may be provided between the pins 129 and 130 and the related supporting member, thereby to increase the rigidity of the connection of the pins to the supporting member.

As seen in FIG. 11, and particularly as shown in the detailed view of FIG. 11A, an angle member 133 is provided at the front end of each of the supporting members 125, 126, 127 and 128 and has a substantially vertical leg 133a secured, as by welding, to the front end of the related supporting member and a substantially horizontal leg 133b extending forwardly from the lower end of the leg 133a. A pivot pin 134 is carried by the leg 133a at the upper end of the latter, and a forwardly extending strip 135 is hingedly mounted, at its back end, upon the pin 134, so that the strip 135 overlies the leg 133b and is free to move angularly toward and away from the latter. The strip 135 has a curved portion 136, at its forward free end, which is adapted to embrace or receive the thrust arm 105. Further, the strip 135 has a tapped hole 137 which receives a screw-threaded portion of a spindle 138 having a crank 139 at the upper end thereof. The lower end portion of the spindle 138 extends rotatably and slidably through a suitable hole in the leg 133b, and a stop or disc 140 is provided on the lower end of the spindle 138 below the leg 133b in order to prevent upward removal of the spindle. A disc 141 is also secured on the spindle 138 at a location between the leg 133b and the strip 135, and a compression spring 142 is interposed between the disc 141 and the leg 133b in order to urge the spindle upwardly with respect to the leg 133b.

Since the spindle 138 is threadably received in the opening 137 of strip 135, the upward force exerted by the spring 142 upon the spindle will be transmitted to the strip 135 so that the curved portion 136 of the latter will react upwardly against the transversely extending thrust beam or rod 105.

As seen in FIG. 11, each of the rake wheels 144, 146, 147 and 148 is rotatable about a bearing 145 carried by a sleeve 143 which is received on the back end of the related supporting member, with the axis of rotation of the rake wheel defined by each bearing 145 being disposed at an acute angle relative to the axis of the sleeve 143, and with the sleeve 143 being secured on the related supporting member in the manner indicated with respect to the sleeves 77, 78, 79 and 80 of the implement described with reference to FIG. 1.

With the arrangement illustrated in FIGS. 10, 11 and 11A, the individual supporting members 125, 126, 127 and 128 may be easily detached from the frame beam 90 for reattachment to the latter at different locations in order to adapt the implement for use as a side delivery rake, a tedder, or a swath turner, in the manner indicated with reference to the embodiment of FIG. 1. In order to detach any one of the supporting members from the frame beam 90, it is only necessary to move the rear end of such supporting member in the upward direction, whereupon the leg 133b comes in contact with the stop 140 on the lowered end of spindle 138 and eventually displaces the latter downwardly so that the strip 135 is then also moved downwardly to disengage its portion 136 from the transverse thrust beam 105. Then, the pins 129 and 130 of the supporting member being removed can be lifted out of the notches 102 of the upright lugs 100 and 101, thereby to free the supporting member with its rake wheel from attachment to the frame beam 90. It is apparent that, when a supporting member is to be attached to the frame beam 90, the above described steps are repeated in the reverse order. Thus, initially, the pins 129 and 130 are placed within the notches 102 while the supporting member is tilted with its back end uppermost so that the curved portion 136 of strip 136 can be placed under the thrust beam 105. Thereafter, when the back end of the newly attached supporting member is lowered, the portion 136 of strip 135 will bear against the thrust beam 105 and, as the back end of the supporting member continues to move downwardly, the spring 142 will be compressed until the spring force is adequate to resiliently resist further downward movement of the back end of the related supporting member and the rake wheel thereon.

During the attachment of each supporting member to the frame beam 90, the supporting member is free to pivot about the axis defined by the related pins 129 and 130, while the spring 142 will resiliently hold the related supporting member in a state of equilibrium. Obviously, the position of equilibrium of each supporting member may be controlled by turning the crank 139 on the related spindle 138 so that the disc 141 will be thereby displaced with respect to the strip 135 to either increase or decrease the force exerted by the spring 142, and thereby to adjust the pressure of the related rake wheel upon the ground being traversed. The stop 140 on the spindle 138 must be located sufficiently below the leg 133b so that, during normal operation, the resilient pivoting of the related supporting member about the axis defined by its pins 129 and 130 will not bring the leg 133b into contact with the stop 140.

When the locking pin 119 is released from the teeth 123 of sector 122, as described above, and the arm 110 is moved downwardly toward the traction bar 93, the thrust beam 105, by reason of its connection, at 113, to the arm 110, will simultaneously press downwardly against the strips 135 of the mountings for the several supporting members. Such downward pivoting of the strips 135 will increase the compression in the related springs 142 to thereby cause downward movement of the related legs 133b, whereby the several supporting members 125, 126, 127 and 128 will be simultaneously pivoted about the axes defined by their pins 129 and 130 in order to lift the back ends of the supporting members for raising the related rake wheels clear of the ground being traversed. Accordingly, it is an easy matter to simultaneously move the rake wheels to inoperative, raised transport positions.

As in the case of the frame beam 1 of the embodiment illustrated in FIG. 1, the frame beam 90 is formed of three hingedly connected portions so that the outer end portions of the frame beam may be pivoted upwardly and inwardly with respect to the central portion in order to reduce the width of the farm implement during transport thereof. However, when the frame beam 90 is formed of three hingedly connected portions, as above, it will be necessary to similarly provide the thrust beam 105 in the form of three hingedly connected portions so that the outer end portions of the thrust beam can be pivoted upwardly and inwardly with the outer end portions of the frame beam.

Figure 12:
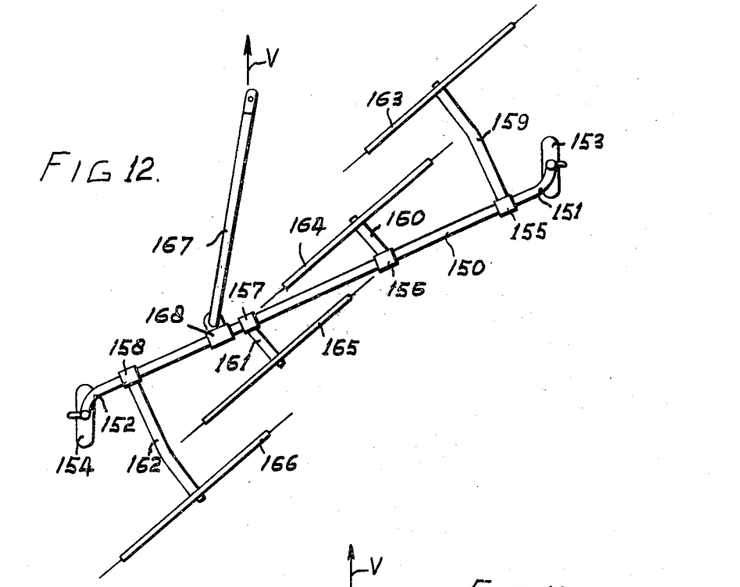
FIG. 12 is a diagrammatic top plan view of a farm implement constructed in accordance with still another embodiment of the present invention, and shown in the working position for use as a side delivery rake operating to deliver the crop toward the left.

Referring now to FIG. 12 of the drawings, it will be seen that a farm implement constructed in accordance with still another embodiment of the present invention includes a frame beam 150 which is supported, at its opposite ends 151 and 152, by running wheels 153 and 154, respectively. Coupling members 155, 156, 157 and 158 releasably engage the frame beam 150 and are adapted to be secured to the latter at any selected locations along the frame beam, as is described and illustrated with respect to FIGURE 1. Supporting members 159, 160, 161 and 162 extend from the coupling members 155, 156, 157 and 158, respectively, and rotatably carry rake wheels 163, 164, 165 and 166, respectively, at their free ends. A draw arm 167 is connected to the frame beam 150 by a coupling 168 resembling the couplings 155–158, and is also releasable from the frame beam and adapted to be secured to the latter at any selected location along the frame beam. The draw arm 167 may be connected, at its forward end, to a tractor or the like to provide means whereby the farm implement may be made to travel over the ground in the direction indicated by the arrow V.

Figure 13:
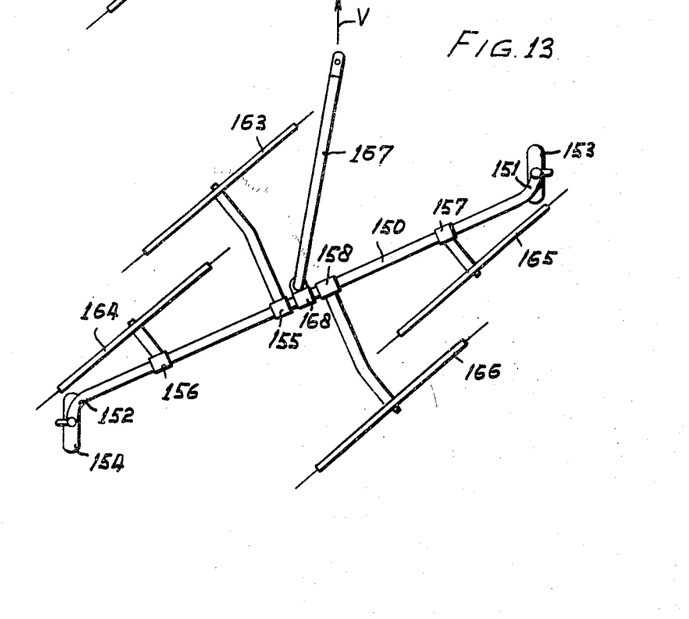
FIG. 13 is a diagrammatic top plan view similar to that of FIG. 12, but with the farm implement converted to the working position for use as a swath turner.

With the several coupling members 155, 156, 157 and 158 arranged relative to the frame beam 150 in the manner indicated in FIG. 12, the several rake wheels 163, 164, 165 and 166 rotate in vertical planes which are inclined relative to the direction of travel and which are in echelon formation so that the implement operates as a side delivery rake. When the coupling members 155, 156, 157, and 158 are removed from the frame beam and then reinstalled on the latter, with their related supporting members and rake wheels, in the arrangement illustrated in FIG. 13, the several rake wheels are then disposed to operate as a swatch turner. In placing the rake wheels in the arrangement indicated in FIG. 13, it is necessary to also release the coupling member 168 of the draw arm 167 and to relocate the coupling member 168 along the frame beam 150, as shown, in order to ensure that the draw arm 167 will clear the path of rotation of the tines on the rake wheel 163.

Although several illustrative embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention, except as defined in the appended claims.

What is claimed is:

1. A raking device adapted to be attached to a traction device, said raking device having a central longitudinally disposed axis and comprising an elongated transverse frame beam, at least two transversely spaced supporting members of unequal length detachably connected to said beam and extending rearwardly therefrom, said members being disposed substantially parallel to said axis and at least two vertically disposed rotary raking members, one connected to each supporting member at an acute angle relative to said axis, the two raking members being disposed on said supporting members at different distances from said beam so as to define a linear arrangement of raking members disposed at an acute angle to said axis for the turning of a swath or the side delivery raking of material lying on the ground as the device traverses the same, said supporting members and raking members being adapted to be rearranged on said beam to define a tedder.

2. A device as claimed in claim 1 wherein said raking members are rake wheels.

3. A device as claimed in claim 1 wherein said raking members are detachably connected to said supporting members.

4. A device as claimed in claim 1 wherein each supporting member is rotatable on an axis parallel to said central axis.

5. A device as claimed in claim 1 comprising means on said supporting members supporting said raking members for free rotation on axes of rotation at acute angles with respect to the associated supporting members and for selective rotation about said supporting members.

6. A device as claimed in claim 1 comprising means on the frame beam supporting the members for movement along the frame beam.

7. A device as claimed in claim 1 comprising means on the frame beam pivotally supporting the supporting members for movement in vertical planes.

8. A device as claimed in claim 1 comprising means on and movable along the supporting members and supporting said raking members.

9. A device as claimed in claim 1 wherein said supporting members are rectilinear.

10. A device as claimed in claim 1 wherein said frame beam includes a central portion and opposite end portions hingedly connected to the central portion.

11. A device as claimed in claim 1 comprising a draw arm connected to said frame beam.

12. A device as claimed in claim 1 comprising running wheels on the frame beam and disposed in front of the raking members.

13. A device as claimed in claim 1 comprising means connecting said supporting members to said frame beam and including bearing means on said frame beam for each supporting member and receiving the latter from above and defining a horizontal pivoting axis for the related supporting member, means on each supporting member extending forwardly of said pivoting axis of the latter, and abutment means carried by said frame beam and engageable from above with said means extending forwardly from the supporting member to hold the latter in said bearing means, whereby each supporting member can be removed from the related bearing means by tilting about said pivoting axis until said means extending forwardly from said supporting member is released from engagement with said abutment means.

14. A device as claimed in claim 13 wherein said abutment means includes a rod extending parallel to said frame beam and mounted for substantially vertical movement relative to the latter so that said raking members can be simultaneously raised to inoperative positions out of contact with the ground by movement of said rod downwardly with respect to said frame beam.

15. A device as claimed in claim 13 wherein said means on each supporting member engageable from above by said abutment means includes an extension of the related supporting member pivotally mounted on the latter to swing relative thereto about a horizontal axis, and resilient means urging said extension upwardly relative to said related supporting member to react against said abutment means thereby to maintain the engagement of said extension with said abutment means and to yieldably resist downward pressure of the associated rake member on said related supporting member against the ground.

16. A device as claimed in claim 15 further comprising individual means for adjusting the force exerted by said resilient means of each supporting member thereby to permit individual adjustment of the pressure of each of said raking members against the ground.

17. A raking device as claimed in claim 1 comprising means connecting said supporting members to said frame beam and including an articulated mounting structure for each supporting member permitting movement of the latter in a vertical plane relative to said frame beam, and adjustable resilient means connected with said articulated mounting structure to yieldably vary the pressure exerted by the related raking members against the ground.

18. A raking device as claimed in claim 17; wherein said articulated mounting structure includes pairs of pivotally connected members defining a deformable parallelogram device, means connecting one side of said device to said frame beam, and means for connecting the related supporting member to the opposite side of said device so that said supporting member remains substantially in a predetermined attitude relative to the ground as it moves vertically with respect to said frame beam.

19. A raking device as claimed in claim 18; wherein said adjustable resilient means includes a spring extending generally diagonally across said deformable parallelogram device, abutments carried by a pair of said pivotally connected members and engaged by the opposite ends of said spring so that the latter urges said parallelogram device to deform in the direction urging the related supporting member upwardly, and means for moving one of said abutments toward and away from said member by which it is carried, thereby to vary the force exerted by said spring for adjusting the vertical position of the related supporting member and raking member with respect to said frame beam.

20. A raking device as claimed in claim 18; wherein said means for connecting the related supporting member to the opposite side of the device includes an attaching member adapted to receive the forward end of the related supporting member and pivotally mounted on said opposite side of the deformable parallelogram device to swing in a vertical plane relative to said opposite side, and means for securing said attaching member to said opposite side in angularly spaced positions relative to the latter wherein the related raking member is disposed for contact with the ground and crop lying thereon, and wherein the related raking member is elevated out of contact with the ground and crop lying thereon, respectively.

References Cited in the file of this patent

UNITED STATES PATENTS

| 2,603,053 | Lipe et al. | July 15, 1952 |

FOREIGN PATENTS

| 163,206 | Australia | May 25, 1955 |
| 1,108,778 | France | Sept. 14, 1955 |